Patented Mar. 8, 1932

1,848,813

UNITED STATES PATENT OFFICE

WILLARD H. WOODSTOCK AND GUY A. McDONALD, OF CHICAGO HEIGHTS, ILLINOIS, ASSIGNORS TO VICTOR CHEMICAL WORKS, A CORPORATION OF ILLINOIS

CONVERSION OF FERROPHOSPHORUS

No Drawing. Application filed March 13, 1930. Serial No. 435,662.

The present invention relates to improvements in the utilization of ferrophosphorus and more particularly in the production of valuable phosphorus compounds readily separable from the iron content of the ferrophosphorus.

In accordance with the present invention, ferrophosphorus is caused to react with sulfur chloride compounds to form phosphorus sulfochloride, the iron content of the ferrophosphorus being converted, at least in part, to iron chloride. The phosphorus sulfochloride, being readily vaporizable, may be separated from the iron content of the reaction mixture.

In carrying out the reaction, the sulfur chloride compound, for example, sulfur monochloride, and the ferrophosphorus are caused to react in a suitable container provided with a reflux condenser. The reaction is exothermic, particularly when finely comminuted or ground ferrophosphorus is employed. Although some heat may be required to initiate reaction and to complete the reaction, by proper control of the admixture of the reacting constituents, the greater part of the reaction can be conducted without the application of external heat. For example, the sulfur chloride may be placed in the container, a small amount of ground ferrophosphorus, say of 200 mesh, added, and the mixture heated under a reflux condenser until reaction begins. It then continues with evolution of heat and by adding further portions of ferrophosphorus at proper intervals, the reaction may be caused to continue until the desired proportion of ferrophosphorus has been added. More heat may then be applied to complete the reaction and when complete, the phosphorus sulfochloride is distilled off. Some unchanged sulfur chloride accompanies it and the phosphorus sulfochloride and sulfur monochloride may be separated, if desired, by fractional distillation or other suitable means. The relative proportions of reagents for reaction may be determined stoichiometrically from the formula; suitable adjustment being made for varying phosphorus content of the ferrophosphorus.

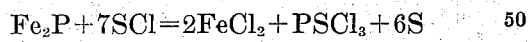

$$Fe_2P + 7SCl = 2FeCl_2 + PSCl_3 + 6S$$

The order of mixing the reactants is immaterial, since the sulfur chloride may be added to the ferrophosphorus, if desired.

Instead of by fractional distillation, however, we prefer to purify the phosphorus sulfochloride of its accompanying sulfur monochloride in the following manner.

The distilled mixture, consisting largely of phosphorus sulfochloride and containing some sulfur chloride, is treated with ferrophosphorus, preferably somewhat in excess of the quantity required for reaction with the sulfur chloride. The mixture is heated to completion of the reaction between the sulfur monochloride and the ferrophosphorus, this being indicated by the disappearance of the characteristic color of the sulfur chloride. The purified phosphorus sulfochloride is then distilled off.

In one mode of operation in accordance with the invention, the residue from the purification process, consisting of a mixture of ferrophosphorus with ferrous chloride and sulfur, may then be employed in the initial reaction with sulfur chloride, together with such additional ferrophosphorus as is necessary for reaction with the quantity of sulfur chloride found convenient for use. When employing this method of operation, it is found desirable to employ an excess of sulfur chloride in the initial reaction with the ferrophosphorus, and to employ an excess of ferrophosphorus in the purifying reaction upon the mixture of phosphorus sulfochloride and sulfur chloride.

In order to make available the sulfur content of the residue from the purification process, the invention may also be carried out in the following manner.

As in the preceding example, a distillate mixture consisting largely of phosphorus sulfochloride and containing some sulfur chloride, derived by an initial operation in which ferrophosphorus is reacted upon with sulfur chloride, is treated with ferrophosphorus, preferably somewhat in excess of the quantity required for reaction with sulfur chloride. As in the preceding example, the mixture is heated to completion of the reaction between the sulfur chloride and the ferrophosphorus, as indicated by the disappearance of the characteristic color of the sulfur chloride. The purified phosphorus sulfochloride is distilled off.

The residue from this purification process, which consists of a mixture of ferrophosphorus, iron chloride, and sulfur, is then treated with a sulfur chloride containing some phosphorus sulfochloride, and derived as hereinafter set forth. The sulfur chloride reacts upon the ferrophosphorus, forming phosphorus sulfochloride, which distills off together with the phosphorus sulfochloride contained in the sulfur chloride employed. In general, it is preferred to use an excess of sulfur chloride in this step of the reaction, so that the distillate product is a phosphorus sulfochloride containing some sulfur chloride, and this distillate product may be purified as hereinbefore described, by treatment with ferrophosphorus, preferably in excess, to remove the sulfur chloride content of the distillate. The residue from the treatment in which the impure phosphorus sulfochloride is obtained consists mainly of ferrous chloride and sulfur.

This residual mixture is heated above the boiling point of sulfur chloride, and chlorine passed therethrough. Sulfur chloride is formed, which contains some phosphorus sulfochloride and the mixture is distilled off and collected. If desired, additional sulfur may be added to the reaction mixture during or prior to the chlorination, to supply the sulfur chloride requirements of the subsequent reactions or sulfur chloride may be added to the distillate. This distillate of sulfur chloride, containing some phosphorus sulfochloride, is then employed in treating the residue of ferrophosphorus, ferrous chloride and sulfur derived from the purification of the phosphorus sulfochloride by ferrophosphorus. A residue consisting preferably of anhydrous ferric chloride is produced.

It is readily apparent that the physical form of the ferrophosphorus as employed in the reaction is not important, but as is the general rule, the more finely comminuted it is, the better the conditions for reaction. Ferrophosphorus ground to 200 mesh has been found suitable, but coarser ferrophosphorus or lump ferrophosphorus may be employed in carrying out the reaction, if desired.

It will be readily apparent that instead of sulfur monochloride, other sulfur chloride compounds may be employed, or the ferrophosphorus may be heated with sulfur and chlorine passed into the mixture. Sulfur chloride products passing off with the phosphorus sulfochloride may be removed by reaction with ferrophosphorus, as hereinbefore set forth.

This application is substituted for and is a continuation in part of our prior application Serial No. 415,606, filed December 20, 1929.

We claim:

1. The method of utilizing ferrophosphorus and converting the phosphorus content thereof into a readily separable form which comprises reacting upon ferrophosphorus with a sulfur-chlorine body, thereby forming phosphorus sulfochloride.

2. The method of utilizing ferrophosphorus and converting the phosphorus content thereof into a readily separable form which comprises heating ferrophosphorus with a sulfur-chlorine body, thereby forming phosphorus sulfochloride, and distilling off the latter.

3. The method of utilizing ferrophosphorus and converting the phosphorus content thereof into a readily separable form which comprises heating ferrophosphorus with an excess of a sulfur-chlorine body, and distilling off the resulting phosphorus sulfochloride and the excess of sulfur chloride.

4. The method of utilizing ferrophosphorus and converting the phosphorus content thereof into a readily separable form which comprises reacting upon ferrophosphorus with an excess of a sulfur-chlorine body, distilling off the resulting phosphorus sulfochloride with the excess sulfur chloride, and removing the sulfur chloride from the mixture.

5. The method of utilizing ferrophosphorus and converting the phosphorus content thereof into a readily separable form which comprises reacting upon ferrophosphorus with sulfur monochloride, thereby forming phosphorus sulfochloride.

6. The method of utilizing ferrophosphorus and converting the phosphorus content thereof into a readily separable form which comprises heating ferrophosphorus with sulfur monochloride, thereby forming phosphorus sulfochloride, and distilling off the latter.

7. The method of utilizing ferrophosphorus and converting the phosphorus content thereof into a readily separable form which comprises heating ferrophosphorus with an excess of sulfur monochloride, and distilling off the resulting phosphorus sulfochloride and the excess of sulfur chloride.

8. The method of utilizing ferrophosphorus and converting the phosphorus content thereof into a readily separable form which comprises reacting upon ferrophosphorus with an excess of sulfur monochloride, distilling off the resulting phosphorus sulfochloride with the excess sulfur chloride, and removing the sulfur chloride from the mixture.

9. The method of utilizing ferrophosphorus and converting the phosphorus content thereof into a readily separable form which comprises reacting upon ferrophosphorus with an excess of sulfur chloride, distilling off the resulting phosphorus sulfochloride and excess sulfur chloride and collecting the mixture and reacting upon the mixture with ferrophosphorus to remove the sulfur chloride therefrom.

10. The method of utilizing ferrophosphorus and converting the phosphorus content thereof into a readily separable form which comprises reacting upon ferrophosphorus with an excess of sulfur chloride, distilling off the resulting phosphorus sulfochloride and excess sulfur chloride and collecting the mixture and reacting upon the mixture of phosphorus sulfochloride and sulfur chloride with ferrophosphorus in excess of that required for reaction with the sulfur chloride, distilling off the purified phosphorus sulfochloride and reacting upon the residue of ferrophosphorus and iron sulfide with additional sulfur chloride.

11. In the method of utilizing ferrophosphorus by converting the phosphorus content thereof into phosphorus sulfochloride, wherein a phosphorus sulfochloride containing sulfur chloride is formed, the steps of reacting upon such phosphorus sulfochloride with an excess of ferrophosphorus, whereby a purified phosphorus sulfochloride is formed and a residue containing ferrophosphorus and sulfur formed, reacting upon the sulfur of said residue with chlorine to form additional sulfur chloride.

12. In the method of utilizing ferrophosphorus by converting the phosphorus content thereof into phosphorus sulfochloride, the steps of reacting upon ferrophosphorus with sulfur chloride to form phosphorus sulfochloride and a residue containing sulfur, reacting upon said residue with chlorine and distilling off sulfur chloride resulting from the action of the chlorine upon the sulfur, and employing the resulting sulfur chloride in further reaction upon ferrophosphorus.

13. In the method of utilizing ferrophosphorus wherein the phosphorus content thereof is converted to phosphorus sulfochloride, the steps of reacting upon ferrophosphorus with sulfur chloride, thereby forming phosphorus sulfochloride and a residue containing fulfur and small proportions of ferrophosphorus, separating the residue and reacting thereupon with chlorine, whereby the sulfur content of the residue is converted to sulfur chloride and the remnant of ferrophosphorus therein to phosphorus sulfochloride.

14. In the method of utilizing ferrophosphorus wherein the phosphorus content thereof is converted to phosphorus sulfochloride, the steps of reacting upon ferrophosphorus with sulfur chloride, thereby forming phosphorus sulfochloride and a residue containing sulfur and small proportions of ferrophosphorus, separating the residue and reacting thereupon with chlorine, whereby the sulfur content of the residue is converted to sulfur chloride and the remnant of ferrophosphorus therein to phosphorus sulfochloride, removing the sulfur chloride and phosphorus sulfochloride thus formed and reacting upon additional ferrophosphorus therewith.

15. In the method of utilizing ferrophosphorus wherein the phosphorus content thereof is converted to phosphorus sulfochloride, and in which phosphorus sulfochloride is secured containing some sulfur chloride, the steps of reacting upon said mixture of phosphorus sulfochloride and sulfur chloride with an excess of ferrophosphorus, thereby forming a purified phosphorus sulfochloride and a residue containing ferrophosphorus and sulfur, reacting upon said residue with an excess of sulfur chloride to form phosphorus sulfochloride containing sulfur chloride which is separated and employed in the initial step, and the residue containing sulfur, reacting upon said sulfur-containing residue with chlorine to form sulfur chloride, and employing such sulfur chloride in reaction upon the residue from the initial step.

In testimony whereof we have hereunto set our hands this 7th day of March, 1930.

WILLARD H. WOODSTOCK.
GUY A. McDONALD.